United States Patent [19]

Nacken et al.

[11] 4,436,706

[45] Mar. 13, 1984

[54] PROCESS FOR THE RECOVERY OF PENTAVALENT VANADIUM COMPOUNDS FROM ACID CATALYST EXTRACTS

[75] Inventors: Lambertus J. G. Nacken; Albertus H. Baas, both of Arnhem, Netherlands

[73] Assignee: Shell Internationale Research Maatschappij B. V., The Hague, Netherlands

[21] Appl. No.: 406,116

[22] Filed: Aug. 6, 1982

[30] Foreign Application Priority Data

Aug. 26, 1981 [NL] Netherlands .......................... 8103964

[51] Int. Cl.³ .............................................. C01G 31/02
[52] U.S. Cl. ........................................ 423/65; 423/592
[58] Field of Search ...................... 423/62, 65, 64, 592

[56] References Cited

U.S. PATENT DOCUMENTS 4,150,092  4/1979  Pitts ........................................ 423/65
4,320,097  3/1982  Brown et al. .......................... 423/62

FOREIGN PATENT DOCUMENTS 1526927  10/1978  United Kingdom .................. 423/62

*Primary Examiner*—Herbert T. Carter
*Attorney, Agent, or Firm*—Pravel, Gambrell, Hewitt, Kirk & Kimball

[57] ABSTRACT

A process for the preparation of pentavalent vanadium compounds by reprocessing acid extracts of vanadium-containing catalysts spent in the hydrotreatment of crude or residual oils, characterized in that extracts containing trivalent and tetravalent vanadium are oxidized at a pH between 0.5 and 2.6 with an oxygen-containing gas to form concentrates of tetravalent vanadium, after which oxidation is carried out at a pH between 2.6 and 4.0 with an oxygen-containing gas to form concentrates of pentavalent vanadium and in that solid vanadium compounds are subsequently recovered by separating them from the liquid phase.

15 Claims, No Drawings

PROCESS FOR THE RECOVERY OF PENTAVALENT VANADIUM COMPOUNDS FROM ACID CATALYST EXTRACTS

The invention relates to a process for the preparation of pentavalent vanadium compounds by treating acid extracts of vanadium-containing catalysts used in the hydrotreatment of crude and residual oils.

In hydrocarbon conversion processes such as hydrocracking, hydrodesulphurization and other hydrogenation processes, the activity of the catalyst used in these processes gradually diminishes if the crude or residual oils contain vanadium. Vanadium then acts as poison and is gradually taken up in the catalyst. In order to prevent this poisoning of the catalyst it is suggested to carry out a separate hydrodemetallization treatment before the desired conversion process in order to remove the vanadium from the crude or residual oil. An example of such a treatment is known from the UK patent specification No. 1,526,927. This prior publication is also concerned with a method for the regeneration of the demetallization catalyst, which comprises extracting the catalyst with a mineral acid, such as sulphuric acid. During this extraction the vanadium passes from the catalyst into the liquid phase, thus resulting in a reprocessed catalyst with a desirable low content of vanadium. It is said that from the acid extract vanadium may be recovered in a conventional manner but a detailed recipe to recover vanadium has not been indicated. The same extraction with a mineral acid may of course also be applied for the regeneration of the vanadium-loaded catalysts obtained during hydrocracking, hydrodesulphurization and other hydrogenation processes.

In the acid extracts the vanadium is partly present in the tetravalent oxidation state and it would be attractive to recover the vanadium in the form of solid pentavalent vanadium compounds. For this purpose efficient separation of the solids from the liquid phase is of course an important condition. The oxidation from tetravalent to pentavalent vanadium may be carried out by oxidation with an oxygen-containing gas at a pH above 8, since the oxidation then proceeds rapidly (see "Handbuch der anorganischen Chemie", Gmelin, 8 (1968), Vanadium A2, P. 555). One then obtains a solution of pentavalent vanadium in a good yield, however it is difficult if is not impossible to precipitate solid pentavalent vanadium compounds from this solution in a form which is readily filterable.

If the oxidation is carried out at a pH in the mildly acid region (of Netherlands patent application No. 6704017, page 5, first paragraph), for example at a pH of approx. 3, the filterability of the solid vanadium compounds during further processing is better, while the oxidation velocity is still sufficiently attractive.

However, since a strong acid is used for the extraction of the spent catalysts, the extracts usually have a pH below 1. The essential increasing of the pH to a value of approx. 3 is unfortunately accompanied by the formation of a solid but non-filterable side-product, which remains unchanged during the subsequent oxidation. A closer examination of the formation of this precipitate has shown that it is mainly caused by the co-presence of trivalent vanadium in the acid extracts.

According to the invention a very good reprocessing method is obtained by carrying out a separate preoxidation of trivalent vanadium to tetravalent vanadium at a pH of approx. 2 before oxidation of tetravalent vanadium to pentavalent vanadium at a pH of approx. 3. The resultant novel twostage oxidation process yields either directly solid pentavalent vanadium compounds having very good filterability or solutions of pentavalent vanadium compounds from which readily filterable solid pentavalent compounds can be subsequently precipitated.

The invention therefore relates to a process for the preparation of pentavalent vanadium compounds by reprocessing acid extracts of vanadium-containing catalysts spent in the hydrotreatment of crude or residual oils, characterized in that extracts containing trivalent and tetravalent vanadium are oxidized at a pH between 0.5 and 2.6 with an oxygen-containing gas to form concentrates of tetravalent vanadium, after which the extracts are oxidized at a pH between 2.6 and 4.0 with an oxygen-containing gas to form concentrates of pentavalent vanadium and in that solid vanadium compounds are subsequently recovered by separating them from the liquid phase.

The first oxidation step is carried out at a pH between 0.5 and 2.6 and preferably between 1.5 and 2.4. During the oxidation the pH is most preferably kept constant by addition of a basic material, for example NaOH or NH$_4$OH. The temperature is normally between 15° and 70° C. The reaction time is usually less than 2 hours and preferably less than 30 minutes. The reaction is preferably carried out in the presence of cupri-ions which are added to the reaction mixture as cupri salts. The oxidation is carried out with an oxygen-containing gas, preferably air or oxygen, which is passed to the reaction mixture at a velocity of 50–500 Nl.l$^{-1}$.h$^{-1}$ with stirring at a rate of 500–4000 rpm.

After the first oxidation step the pH is increased to a value between 2.6 and 4.0 by the addition of a base, for example NaOH or NH$_4$OH. The second oxidation step from tetravalent to pentavalent vanadium is subsequently carried out with the aid of an oxygen-containing gas, for example air or oxygen, preferably at a constant pH. The gas flow velocity is normally between 15 and 75 Nl.l$^{-1}$.h$^{-1}$. The stirring rate is then 500–4000 rpm. The quantity of oxygen added may be considerably larger than the quantity required to oxidize the vanadium present. This need, however, not pose a problem since the excess amount can be recycled via a pump system. The reaction may be carried out in the presence of cupri-ions which may be present in the reaction mixture obtained in the first step or which may, if desired, be added to said reaction mixture. The reaction time is mostly less than 4 hours, the temperature is usually between 30° and 120° C.

When carrying out the first oxidation step the conversion of trivalent to tetravalent vanadium should be as complete as possible; this does not, however, apply to the conversion of tetravalent to pentavalent vanadium in the second oxidation step. It has been found that the degree of conversion and the reaction temperature in the second oxidation step are important parameters for the ultimate production of solid vanadium compounds having the desired ease of filtration.

When a relatively high temperature, viz. 70°–110° C., is used in the second oxidation step a solid is directly precipitated during the oxidation, the ratio between tetravalent and pentavalent vanadium in the solid being between 0.10:1 and 0.30:1. This solid is found to have a very good filterability and this embodiment of the process according to the invention is therefore most preferred. Optimum filterability of the solid is at a ratio between tetravalent and pentavalent vanadium of approx. 0.16:1. The precipitate then very closely corresponds with corvusite ($V_2O_4.6V_2O_5.nH_2O$). Subsequent to filtration the remaining liquid is found to contain only very little vanadium.

However, it is also possible to obtain a similar corvusite-like substance by carrying out the second oxidation step at a lower temperature, provided that the oxidation is continued for such a period of time that the ratio between tetravalent and pentavalent vanadium is within the limits discussed. In that case the oxidation results in a clear solution from which the corvusite-like substance is subsequently precipitated by merely raising the temperature to values in excess of 75° C.

Another preferred embodiment is based on a more complete conversion in the second oxidation step. To this end a degree of conversion of at least 85%, preferably at least 95%, is provided for at an oxidation temperature of 35°–70° C. A clear solution of substantially pentavalent vanadium then results. By addition of a strong acid, such as sulphuric acid, a solid is precipitated from the solution which solid may best be described as "red cake", having e.g. the composition $Na_2H_2V_6O_{17}$, or that of silimar acid polyvanadates. This precipitation preferably proceeds at elevated temperature, by preference at a temperature above 90° C.

It has been found that the vanadium compounds obtained by following the above procedures can be filtered in an excellent manner. The yield is good, usually at least 80%, and the compounds satisfy the usual sales specifications in most respects.

If required, the solid vanadium compounds can be converted into vanadium pentoxide by roasting.

The invention is elucidated below with reference to some examples. The acid vanadium concentrate samples described therein were obtained as follows:

A catalyst containing 0.5 parts by weight of nickel and 2.0 parts by weight of vanadium per 100 parts by weight of silica carrier was prepared by impregnating a silica carrier with an aqueous solution of nickel nitrate and vanadyl oxalate, the composition being subsequently dried and calcined. The catalyst (catalyst A) was used in sulphidic form for the hydrodemetallization of a hydrocarbon oil having a total vanadium and nickel content of 62 ppmw, a $C_5$-asphaltenes content of 6.4% by weight and a sulphur content of 3.9% by weight, which oil had been obtained as a residue in the atmospheric distillation of a Middle East crude. The hydrodemetallization was carried out by passing the oil together with hydrogen downwardly, through a vertically arranged, cylindrical, fixed catalyst bed at a temperature of 420° C., a total pressure of 150 bar, a space velocity of 5 kg.$l^{-1}$.$h^{-1}$ and a gas flow velocity (measured at the reactor outlet) of 250 Nl $H_2$.$kg^{-1}$. After the catalyst had been deactivated in this process, it was extracted with toluene in order to remove remaining residual oil and after the toluene had been evaporated from the catalyst the latter was analyzed. The deactivated catalyst (catalyst B) contained 9.7 parts by weight of carbon, 20.6 parts by weight of sulphur, 4.1 parts by weight of nickel and 24.3 parts by weight of vanadium per 100 parts by weight of silica. A quantity of 5 kg of catalyst B was treated with steam for 5 hours at a temperature of 350° C., a pressure of 3 bar and a space velocity of 2.6 kg of steam/kg of catalyst/hour. The catalyst was subsequently extracted with 20 l of 4 N sulphuric acid for 1 hour at 90° C. with stirring. After the extracted catalyst had been washed with water, it was dried at 120° C. Analysis of the dried catalyst showed that 96% of the vanadium and 60% of the nickel had been removed from the catalyst.

The sulphuric acid extract has a pH of 0.85 and is described below as "vanadium concentrate". Its vanadium content is 16.4 g.$l^{-1}$; the concentrate also contains 1.1 g.$l^{-1}$ of iron, 1.9 g.$l^{-1}$ of nickel and 24.1 g.$l^{-1}$ of sulphur.

EXAMPLE I

A quantity of 200 ml of vanadium concentrate was transferred to a 250 ml glass reaction vessel provided with a gas supply tube debouching below the liquid level and with a Rushton turbine stirrer. The pH of the concentrate was adjusted to 2.0 by adding 80 mmol of NaOH.

At 2000 rpm air was introduced at room temperature for 8 minutes at a gas supply velocity of 280 Nl.$l^{-1}$.$h^{-1}$ while maintaining the pH at 2.0 by the gradual addition of 20 mmol of NaOH. Copper sulphate was added in order to set a cupri-concentration of 25 mg.$l^{-1}$ some time after the supply of air had started. The concentration of trivalent vanadium in the concentrate, which initially amounted to 9.6 g.$l^{-1}$, was reduced by the oxidation to a very low value so that the conversion of trivalent vanadium was practically quantitative. The colour of the concentrate changed from blue-green to dark blue; the solution remained clear, i.e. no precipitate was formed.

After this first-step oxidation the pH was adjusted to 3.0 by the addition of 14 mmol of NaOH. The temperature was increased to 85° C. and oxygen was passed through for 4 hours at a velocity of 30 Nl.$l^{-1}$.$h^{-1}$. The stirrer continued to operate at 2000 rpm, 138.5 mmol of NaOH was gradually added to maintain the pH constant at 3.0. A precipitate was formed which was found to be excellently filterable (filtration velocity 160 l.$m^{-2}$.$min^{-}$). The solid was washed with 50 ml of water and with 50 ml of a 10% ammonium nitrate solution and subsequently dried. The resultant solid had a composition similar to that of corvusite (ratio of tetravalent to pentavalent vanadium 0.25:1). A total quantity of 3.20 g of vanadium was recovered so that the vanadium yield was 97%.

EXAMPLE II

The first-stage oxidation was carried out in the manner of Example I. A quantity of 15 mmol of NaOH was added to the resultant clear dark-blue solution to reduce its pH to 3.0. Oxygen was subsequently passed through for 4 hours at a velocity of 30 Nl.$l^{-1}$.$h^{-1}$ and a temperature of 50° C. at 2000 rpm. By gradually adding 140 mmol of NaOH the pH remained constant at 3.0. A quantity of 62 mmol of sulphuric acid was added to the resultant clear solution and after stirring for 1 hour at 95° C. a precipitate (red cake) was formed which was found to be very readily filterable. The solid was washed with 50 ml of water and 50 ml of 10% ammonium nitrate solution. A solid was obtained which contained 2.88 g of vanadium so that the yield amounted to 88%.

EXAMPLE III

Example I was repeated under the same conditions, with the exception that an oxygen supply velocity 60 instead of 30 Nl$^{-}$.$h^{-1}$ was applied. The precipitate obtained after 4 hours was removed by filtration, washed, dried and calcined in the same manner. A quantity of 48 mmol of sulphuric acid was subsequently added to the filtrate. After stirring for 1 hour a red-cake precipitate was formed which was also removed by filtration, washed and dried. The two precipitates contained 0.98 and 1.80 g of vanadium, so that the yield amounted to 85%.

EXAMPLE IV (For Comparison)

A quantity of 100 ml of vanadium concentrate was reduced with NaOH to a pH of 3.0. Oxygen was passed through for 1 hour at a velocity of 120 Nl.l$^{-1}$.h$^{-1}$ at a stirring velocity of 2000 rpm.

The respective temperatures were 20°, 50°, 70° and 90° C. In each case a non-filterable, light-green precipitate was obtained. The use of air instead of oxygen, a reduction or increase in reaction time, variation of the gas supply velocity or addition of copper sulphate invariably resulted in the formation of the same non-filterable precipitate.

We claim:

1. A process for the preparation of pentavalent vanadium compounds by reprocessing acid extracts of vanadium-containing catalysts spent in the hydrotreatment of crude or residual oils, characterized in that extracts containing trivalent and tetravalent vanadium are oxidized at a pH between 0.5 and 2.6 with an oxygen-containing gas to form concentrates of tetravalent vanadium, after which oxidation is carried out at a pH between 2.6 and 4.0 with an oxygen-containing gas to form concentrates of pentavalent vanadium.

2. A process as claimed in claim 1, characterized in that the pH is kept constant during both oxidation steps.

3. A process as claimed in claim 1 or 2, characterized in that the first oxidation step is carried out in the presence of cupri-ions.

4. A process as claimed in claim 3, characterized in that the oxygen-containing gas used is air.

5. A process as claimed in claim 1, characterized in that the first oxidation step is carried out at a temperature of 15°–70° C.

6. A process as claimed in claim 1, characterized in that the second oxidation step is carried out at a temperature of 30°–120° C.

7. A process as claimed in claim 6, characterized in that the temperature is 70°–110° C. and that the resultant precipitate of solid vanadium compounds is separated from the liquid phase by filtration.

8. A process as claimed in claim 6, characterized in that the temperature is 35°–70° C. and that solid vanadium compounds are precipitated by addition of a mineral acid, the compounds being subsequently separated from the liquid phase by filtration.

9. A process as claimed in claims 1, 2, 5, 6, 7 or 8, characterized in that the pentavalent vanadium compounds are recovered in a yield of at least 80%, calculated on the vanadium in the starting material.

10. A process for the preparation of pentavalent vanadium compounds by reprocessing acid extracts of trivalent and tetravalent vanadium-containing catalysts spent in the hydrotreatment of crude or residual oils comprising:
    oxidizing process acid extracts of trivalent and tetravalent vanadium-containing catalysts with an oxygen-containing gas at a pH of from about 0.5 to about 2.6 and a temperature of from about 15° C. to 70° C., to form concentrates of tetravalent vanadium;
    oxidizing said concentrates of tetravalent vanadium with an oxygen-containing gas at a pH of from about 2.6 to about 4.0 and a sufficient degree of temperature for a sufficient amount of time to yield a pentavalent vanadium-containing precipitate which is readily filterable; and
    filtering said pentavalent vanadium-containing precipitate.

11. The process of claim 10, wherein the pH is kept constant during both of said oxidizing steps, said oxidizing of said process acid extracts of trivalent and tetravalent vanadium-containing catalysts is carried out in the presence of cupri-ions and said oxygen-containing gas is air.

12. The process of claim 10, wherein said yield of said pentavalent vanadium-containing precipitate is at least 80% by weight of the percent by weight of said vanadium in said vanadium-containing catalysts.

13. The process of claim 10, wherein:
    said oxidizing of said concentrates of tetravalent vanadium is carried out at a temperature of from about 70° C. to about 110° C. and said pentavalent vanadium-containing precipitate has from about a 0.10:1 to about a 0.30:1 ratio of tetravalaent vanadium to pentavalent vanadium.

14. The process of claim 10, wherein said oxidizing of said concentrate of tetravalent vanadium is carried out at a temperature of from about 30° C. to about 120° C. to produce a clear solution and further comprising the step of exposing said solution to a temperature of at least about 75° C. for a sufficient amount of time to yield a pentavalent vanadium-containing precipitate, which is readily filtered, said precipitate having from about a 0.10:1 to about a 0.30:1 ratio of tetravalent vanadium to pentavalent vanadium.

15. The process of claim 10, wherein
    said oxidizing of said concentrate of tetravalent vanadium is at a temperature of from about 35° C. to about 70° C. to produce a clear solution, and
    further comprising the step of adding an amount of an acid sufficient to yield a pentavalent vanadium-containing precipitate which is readily filtered, said precipitate having less than about a 0.10:1 ratio of tetravalent vanadium to pentavalent vanadium.

* * * * *